United States Patent
Kesavan et al.

(10) Patent No.: US 12,519,904 B2
(45) Date of Patent: Jan. 6, 2026

(54) LIVENESS PROTOCOL WITH CLOCK DRIFT CORRECTION FOR AN ENCRYPTED VIDEOCONFERENCE

(71) Applicant: Zoom Video Communications, Inc., San Jose, CA (US)

(72) Inventors: Balachandar Ganesh Kesavan, New York, NY (US); Antonio Marcedone, New York, NY (US)

(73) Assignee: Zoom Communications, Inc., San Jose, CA (US)

( * ) Notice: Subject to any disclaimer, the term of this patent is extended or adjusted under 35 U.S.C. 154(b) by 230 days.

(21) Appl. No.: 18/360,263

(22) Filed: Jul. 27, 2023

(65) Prior Publication Data

US 2024/0275920 A1    Aug. 15, 2024

Related U.S. Application Data

(60) Provisional application No. 63/445,907, filed on Feb. 15, 2023.

(51) Int. Cl.
*H04N 7/15* (2006.01)
*H04L 9/08* (2006.01)
(Continued)

(52) U.S. Cl.
CPC .............. *H04N 7/15* (2013.01); *H04L 9/0869* (2013.01); *H04L 51/046* (2013.01);
(Continued)

(58) Field of Classification Search
CPC ... H04L 43/0852; H04L 43/0811; H04L 69/28
See application file for complete search history.

(56) References Cited

U.S. PATENT DOCUMENTS 11,258,590 B1   2/2022   Tsarfati et al.
11,546,390 B1   1/2023   Boodaei et al.
(Continued)

FOREIGN PATENT DOCUMENTS

EP    3301873 A1    4/2018

OTHER PUBLICATIONS

EP International Search Report and Written Opinion for PCT/US2024/015326 mailed Jun. 6, 2024.
(Continued)

*Primary Examiner* — Amal S Zenati
(74) *Attorney, Agent, or Firm* — Kilpatrick Townsend & Stockton LLP

(57) ABSTRACT

In one example, a participant device can receive a heartbeat message from a leader device associated with a videoconferencing meeting. The participant device can correspond to a participant in the videoconferencing meeting. The participant device can determine a current time, extract a send time from the heartbeat message, and determine an offset value indicating a difference between a first clock of the participant device and a second clock of the leader device. The participant device can then determine a last heartbeat message time based on the send time and the offset value. Based on the current time and the last heartbeat message, the participant device can determine whether to disconnect from or stay connected to the videoconferencing meeting.

20 Claims, 9 Drawing Sheets

(51) Int. Cl.
*H04L 9/40* (2022.01)
*H04L 51/046* (2022.01)
*H04L 65/1093* (2022.01)
*H04L 65/403* (2022.01)
*H04L 65/80* (2022.01)

(52) U.S. Cl.
CPC ...... *H04L 63/0457* (2013.01); *H04L 65/1093* (2013.01); *H04L 65/403* (2013.01); *H04L 65/80* (2013.01)

(56) References Cited

U.S. PATENT DOCUMENTS

| | | |
|---|---|---|
| 2011/0302408 A1 | 12/2011 | Mcdermott et al. |
| 2016/0307165 A1 | 10/2016 | Grodum et al. |
| 2018/0091407 A1* | 3/2018 | Tervonen ............... H04L 43/103 |
| 2020/0044760 A1* | 2/2020 | Seed ..................... H04J 3/0638 |
| 2022/0376895 A1* | 11/2022 | Booth .................... H04L 9/3247 |
| 2022/0377057 A1 | 11/2022 | Lyons et al. |

OTHER PUBLICATIONS

EP International Search Report and Written Opinion for PCT/US2024/015322 mailed May 29, 2024.

U.S. Appl. No. 18/360,188, "Non-Final Office Action", Jun. 16, 2025, 9 pages.

* cited by examiner

LIVENESS PROTOCOL WITH CLOCK DRIFT CORRECTION FOR AN ENCRYPTED VIDEOCONFERENCE

CROSS-REFERENCE TO RELATED APPLICATION

This application claims priority to U.S. Provisional Application No. 63/445,907 filed Feb. 15, 2023 and titled "END-TO-END ENCRYPTED ZOOM MEETINGS: PROVING SECURITY AND STRENGTHENING LIVENESS," the entirety of which is hereby incorporated by reference herein.

TECHNICAL FIELD

The present application generally relates to videoconferencing and, more particularly, relates to a liveness protocol for an encrypted videoconference, where the liveness protocol is configured to correct for clock drift between a leader device and a participant device.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
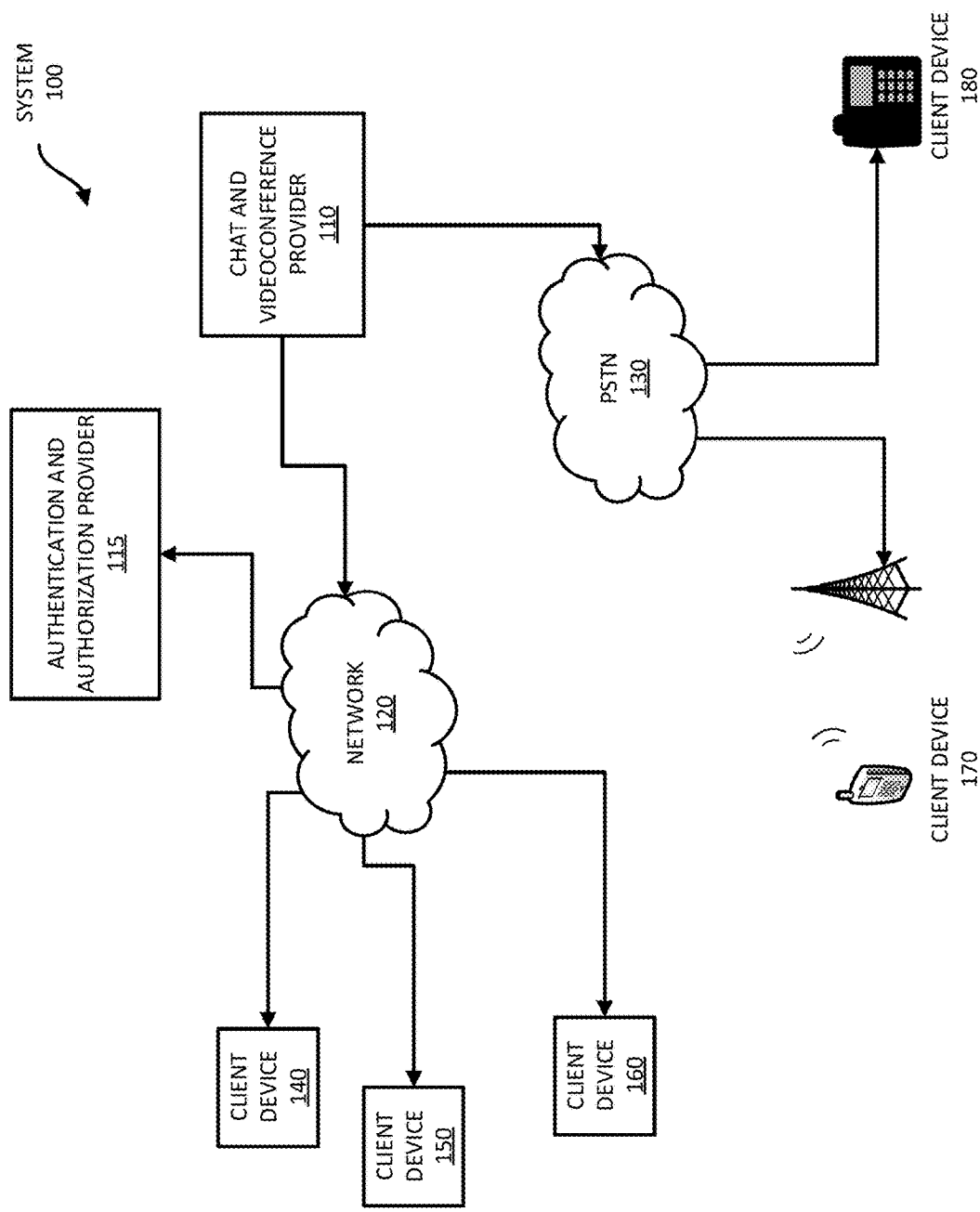
FIG. 1 shows an example of a system for providing videoconferencing and chat functionality to various client devices according to some aspects of the present disclosure.

Examples are described herein in the context of enforcing a liveness requirement on a videoconference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, without having to be at the same physical location. Participants can be invited to a videoconference meeting, join from their personal computers or telephones, and are able to see and hear each other and converse largely as they would during an in-person group meeting or event. In particular, the participants receive media streams (e.g., audio and/or video streams) from the other participants and are presented with them. Using these different modalities, the participants can see and hear each other, engage more deeply, and generally have a richer experience despite not being physically in the same space.

Because the content of a videoconference may be sensitive or personal, some videoconference providers now offer end-to-end (E2E) encryption. In an E2E encrypted videoconference, a host device associated with a host of the videoconference can generate a message key (e.g., an encryption/decryption key). The host device can then transmit the message key to other participant devices associated with the other participants of the videoconference. The participant devices can use the message key to encrypt their respective media streams prior to transmitting them. Additionally, or alternatively, the participant devices can use the message key to decrypt the media streams received from the other participant devices. Using the message key to encrypt/decrypt the media streams can improve security.

A defining feature of a videoconference that distinguishes it from the asynchronous nature of text messaging is that a videoconference happens in real-time with some or all participants online at the same time. Because of the real-time nature of videoconference, it can be desirable for videoconferences to have a high degree of "liveness". For example, participants should quickly learn of updates to the meeting roster and encryption key, displayed media streams should be recent, and banned participants should promptly lose access to the meeting. But videoconferencing systems often fail to enforce any liveness requirements. When liveness is not sufficiently enforced, it is possible for an attacker to arbitrarily delay communications. For example, if Alice sends a media stream at time t and liveness is not sufficiently enforced, then Bob may receive the media stream at a time that is much later than t, which may pose a significant threat depending on the content of the communication (e.g., if the communication is an instruction to buy or sell a certain stock, then the ability to delay the communication might allow an attacker to front run the instruction). It is also possible for an attacker to prevent or delay certain management actions, such as adding or removing parties from the videoconference, from taking effect.

Some examples of the present disclosure can overcome one or more of the abovementioned problems by providing a liveness protocol that enforces a liveness constraint (e.g., requirement) on a videoconference. In particular, the leader device can transmit heartbeat messages to the participant device. The leader device can include a send time ($T_{SENT}$) in each heartbeat message, where the send time indicates the time in which the heartbeat message was sent according to a local clock on the leader device. The local clock of the leader device is referred to herein as the leader clock. The participant device can receive and process each of the heartbeat messages. Based on whether the heartbeat messages conform to the liveness constraint, the participant device can maintain a connection to the videoconference or disconnect from it.

To process a heartbeat message, the participant device can determine a receipt time ($T_{RECEIPT}$) of the heartbeat message. The receipt time can be the time at which the participant device received the heartbeat message according to the participant device's local clock, referred to herein as the participant clock. The participant device can also compute an estimated send time (LAST_HB) at which the heartbeat message was sent by the leader device according to the participant clock. The participant device can compute the estimated send time based on the send time ($T_{SENT}$) in the heartbeat message and other factors, as discussed in greater detail below. The participant device can also determine a liveness protocol parameter ($\Delta_{LIVE}$), which can be a predefined protocol value stored in memory and retrieved as needed by the participant device. The liveness protocol parameter can be a constraint that represents an acceptable amount of delay between when the heartbeat message was sent by the leader device and when it was received by the participant device. After determining these values, the participant device can determine whether $T_{now}$−LAST_HB>$\Delta_{LIVE}$, where $T_{now}$ is the current time according to the participant's clock. The participant device may repeatedly perform this check, for example once per second. If the participant device determines that $T_{now}$−LAST_HB>$\Delta_{LIVE}$, the participant device can determine that a liveness constraint has been violated and automatically disconnect from the videoconference. Otherwise, the participant device can maintain its connection to the videoconference. In this way, the participant device can enforce the liveness constraint. Enforcing the liveness constraint can prevent an attacker from performing malicious actions, such as delaying the transmission of a new meeting key from the host device so that participants keep using the old meeting key for longer than is desirable.

In some examples, the liveness protocol can account for clock differences between the leader device (e.g., host device) and the participant device. As discussed above, the participant device can compute an estimated send time (LAST_HB) associated with the heartbeat message. Although the heartbeat message includes a send time ($T_{SENT}$) according to the leader clock, there may be differences between the leader's clock and the participant's clock that make it challenging to determine exactly when the heartbeat message was sent in some scenarios. As a result of these clock differences, there may be an offset ($\delta$) between the leader's clock and the participant's clock, which can make it inaccurate to rely on the send time alone in some circumstances.

To help resolve the abovementioned problems, in some examples the participant device can determine the estimated send time (LAST_HB) based on the clock offset ($\delta$) between the participant clock and the leader clock. But because it can be difficult to determine an exact clock offset, the participant device can compute an offset range (e.g., an offset window). The offset range can have a lower boundary ($\delta^{min}$) and an upper boundary ($\delta^{max}$). As will be described in greater detail below, the offset upper boundary and the offset lower boundary can be dynamically adjusted over the course of the videoconference, for example as more heartbeat messages are received by the participant device, so that they gradually become more refined and the offset range narrows. As the offset range narrows, the participant device can more accurately estimate when the current heartbeat message was sent, which can help the participant device more accurately determine whether the liveness constraint is satisfied.

In some examples, the techniques described herein can guarantee the liveness of the meeting keys. For example, each time the host device creates a new meeting key for the videoconferencing meeting, the host device can transmit a communication to the participant device to provide the new meeting key to the participant device. Thereafter, the host device can also transmit heartbeat messages to the participant device for processing as described above. This can help guarantee the liveness of the new meeting key that was provided in the communication and, in turn, that the actual meeting streams are recent.

This illustrative example is given to introduce the reader to the general subject matter discussed herein and the disclosure is not limited to this example. The following sections describe various additional non-limiting examples.

Referring now to FIG. 1, FIG. 1 shows an example of a system 100 that provides videoconferencing functionality to various client devices. The system 100 includes a chat and videoconference provider 110 that is connected to multiple communication networks 120, 130, through which various client devices 140-180 can participate in videoconferences hosted by the chat and videoconference provider 110. For example, the chat and videoconference provider 110 can be located within a private network to provide video conferencing services to devices within the private network, or it can be connected to a public network, e.g., the internet, so it may be accessed by anyone. Some examples may even provide a hybrid model in which a chat and videoconference provider 110 may supply components to enable a private organization to host private internal videoconferences or to connect its system to the chat and videoconference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and videoconference provider 110 and manage user authorization for the various services provided by chat and videoconference provider 110. In this example, the authentication and authorization provider 115 is operated by a different entity than the chat and videoconference provider 110, though in some examples, they may be the same entity.

Figure 2:
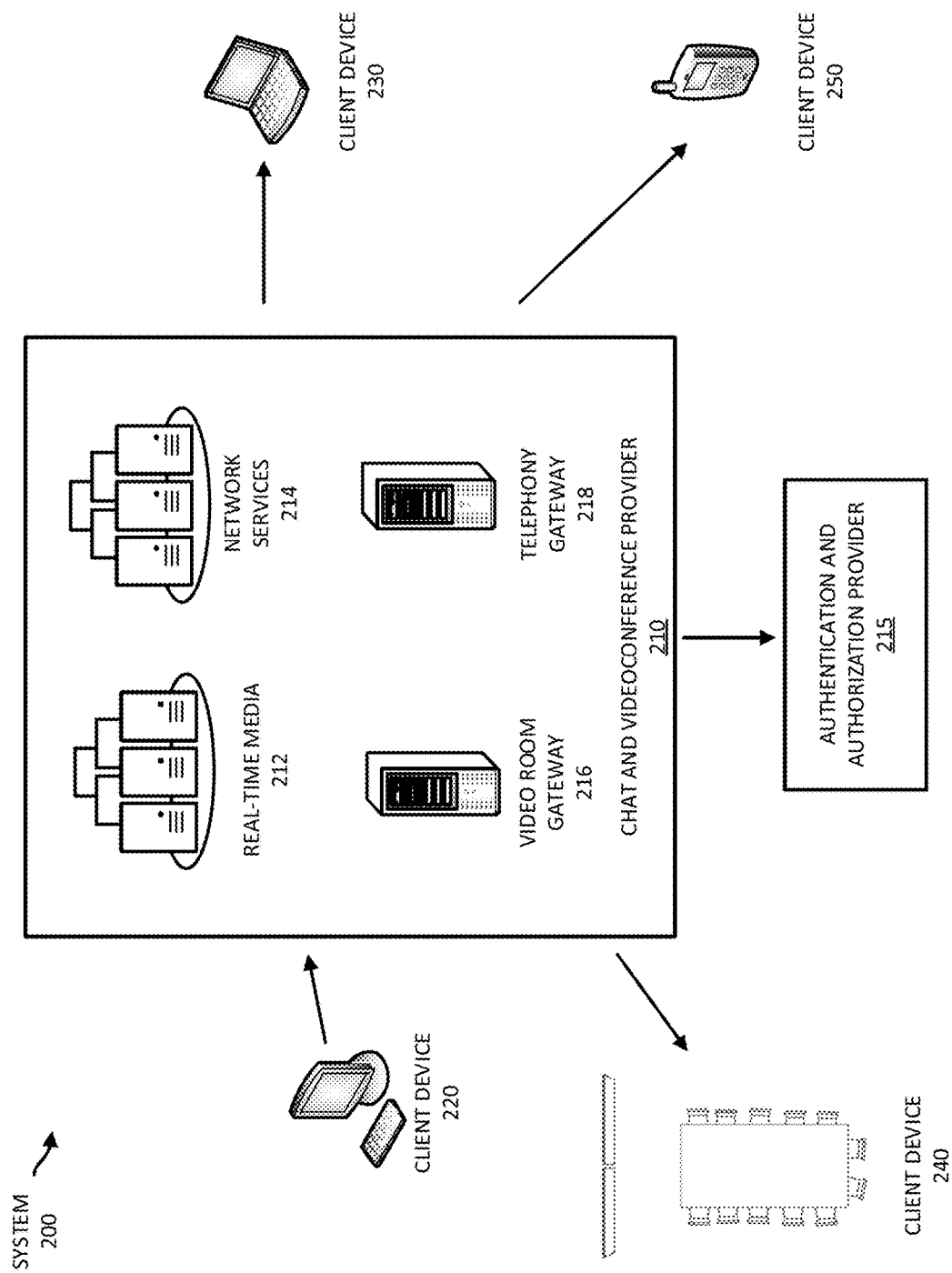
FIG. 2 shows another example of a system for providing videoconferencing and chat functionality to various client devices according to some aspects of the present disclosure.

Chat and videoconference provider 110 allows clients to create videoconference meetings ("videoconferences" or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and videoconference provider 110. It should be understood that the term "meeting" encompasses the term "webinar" used herein.

Meetings in this example chat and videoconference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and videoconference provider 110, a user may contact the chat and videoconference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and videoconference provider 110 may prompt the user for certain information, such as a date, time, and duration for the meeting, a number of participants, a type of encryption to use, whether the meeting is confidential or open to the public, etc. After receiving the various meeting settings, the chat and videoconference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and videoconference provider 110. They also receive audio or video information from the chat and videoconference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and videoconference provider 110 may also invalidate the meeting information, such as the meeting identifier or password/passcode.

To provide such functionality, one or more client devices 140-180 may communicate with the chat and videoconference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and videoconference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a videoconference meeting hosted by the chat and videoconference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and videoconference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, the client devices 140-160 contact the chat and videoconference provider 110 using network 120 and may provide information to the chat and videoconference provider 110 to access functionality provided by the chat and videoconference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and videoconference provider 110.

An authentication and authorization provider 115 may be any entity trusted by the chat and videoconference provider 110 that can help authenticate a user to the chat and videoconference provider 110 and authorize the user to access the services provided by the chat and videoconference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc.

However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and videoconference provider 110. The authentication and authorization provider 115 may require the explicit consent of the user before allowing the chat and videoconference provider 110 to access the user's account information for authentication and authorization purposes.

Once the user is authenticated, the authentication and authorization provider 115 may provide the chat and videoconference provider 110 with information about services the user is authorized to access. For instance, the authentication and authorization provider 115 may store information about user roles associated with the user. The user roles may include collections of services provided by the chat and videoconference provider 110 that users assigned to those user roles are authorized to use. Alternatively, more or less granular approaches to user authorization may be used.

When the user accesses the chat and videoconference provider 110 using a client device, the chat and videoconference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and videoconference provider 110 either provides or denies access to its services, respectively.

For telephony devices, e.g., client devices 170-180, the user may place a telephone call to the chat and videoconference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and videoconference provider 110. For example, telephony devices may be unable to provide authentication information to authenticate the telephony device or the user to the chat and videoconference provider 110. Thus, the chat and videoconference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and videoconference provider 110, even in cases where the user could authenticate and employ a client device capable of authenticating the user to the chat and videoconference provider 110. The chat and videoconference provider 110 may determine whether to allow such anonymous users to use services provided by the chat and videoconference provider 110. Anonymous users, regardless of the reason for anonymity, may be restricted as discussed above with respect to users employing telephony devices, and in some cases may be prevented from accessing certain meetings or other services, or may be entirely prevented from accessing the chat and videoconference provider 110.

Referring again to chat and videoconference provider 110, in some examples, it may allow client devices 140-160 to encrypt their respective video and audio streams to help improve privacy in their meetings. Encryption may be provided between the client devices 140-160 and the chat and videoconference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and videoconference provider 110, while allowing the chat and videoconference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and videoconference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and videoconference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and videoconference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the chat and videoconference provider 210 over a communications network, such as the internet for client devices 220-240 or the PSTN for client device 250, generally as described above with respect to FIG. 1. The chat and videoconference provider 210 is also in communication with one or more authentication and authorization providers 215, which can authenticate various users to the chat and videoconference provider 210 generally as described above with respect to FIG. 1.

In this example, the chat and videoconference provider 210 employs multiple different servers (or groups of servers) to provide different examples of videoconference functionality, thereby enabling the various client devices to create and participate in videoconference meetings. The chat and videoconference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and videoconference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the chat and videoconference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and videoconference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and videoconference provider 210 may allow a meeting participant to notify it of inappropriate behavior or content in a meeting. Such a notification may trigger the real-time media servers to 212 record a portion of the meeting for review by the chat and videoconference provider 210. Still other functionality may be implemented to take actions based on the decrypted multimedia streams at the chat and videoconference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and videoconference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and videoconference provider under a supervisory set of servers. When a client device 220-250 accesses the chat and videoconference provider 210, it will typically communicate with one or more network services servers 214 to access their account or to participate in a meeting.

When a client device 220-250 first contacts the chat and videoconference provider 210 in this example, it is routed to a network services server 214. The client device may then provide access credentials for a user, e.g., a username and password or single sign-on credentials, to gain authenticated access to the chat and videoconference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and videoconference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and videoconference provider 210 anonymously. When communicating anonymously, a client device 220-250 may communicate with one or more network services servers 214 but only provide information to create or join a meeting, depending on what features the chat and videoconference provider allows for anonymous users. For example, an anonymous user may access the chat and videoconference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and videoconference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and videoconference provider 210. For example, the video conferencing hardware may be provided by the chat and videoconference provider to one or more of its subscribers, which may provide access credentials to the video conferencing hardware to use to connect to the chat and videoconference provider 210.

The video room gateway servers 216 provide specialized authentication and communication with the dedicated video conferencing hardware that may not be available to other client devices 220-230, 250. For example, the video conferencing hardware may register with the chat and videoconference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and videoconference provider 210.

Referring now to the telephony gateway servers 218, these servers 218 enable and facilitate telephony devices' participation in meetings hosted by the chat and videoconference provider 210. Because telephony devices communicate using the PSTN and not using computer networking protocols, such as TCP/IP, the telephony gateway servers 218 act as an interface that converts between the PSTN, and the networking system used by the chat and videoconference provider 210.

For example, if a user uses a telephony device to connect to a meeting, they may dial a phone number corresponding to one of the chat and videoconference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and videoconference provider 210 discussed above are merely examples of such devices and an example architecture. Some videoconference providers may provide more or less functionality than described above and may not separate functionality into different types of servers as discussed above. Instead, any suitable servers and network architectures may be used according to different examples.

Figure 3:
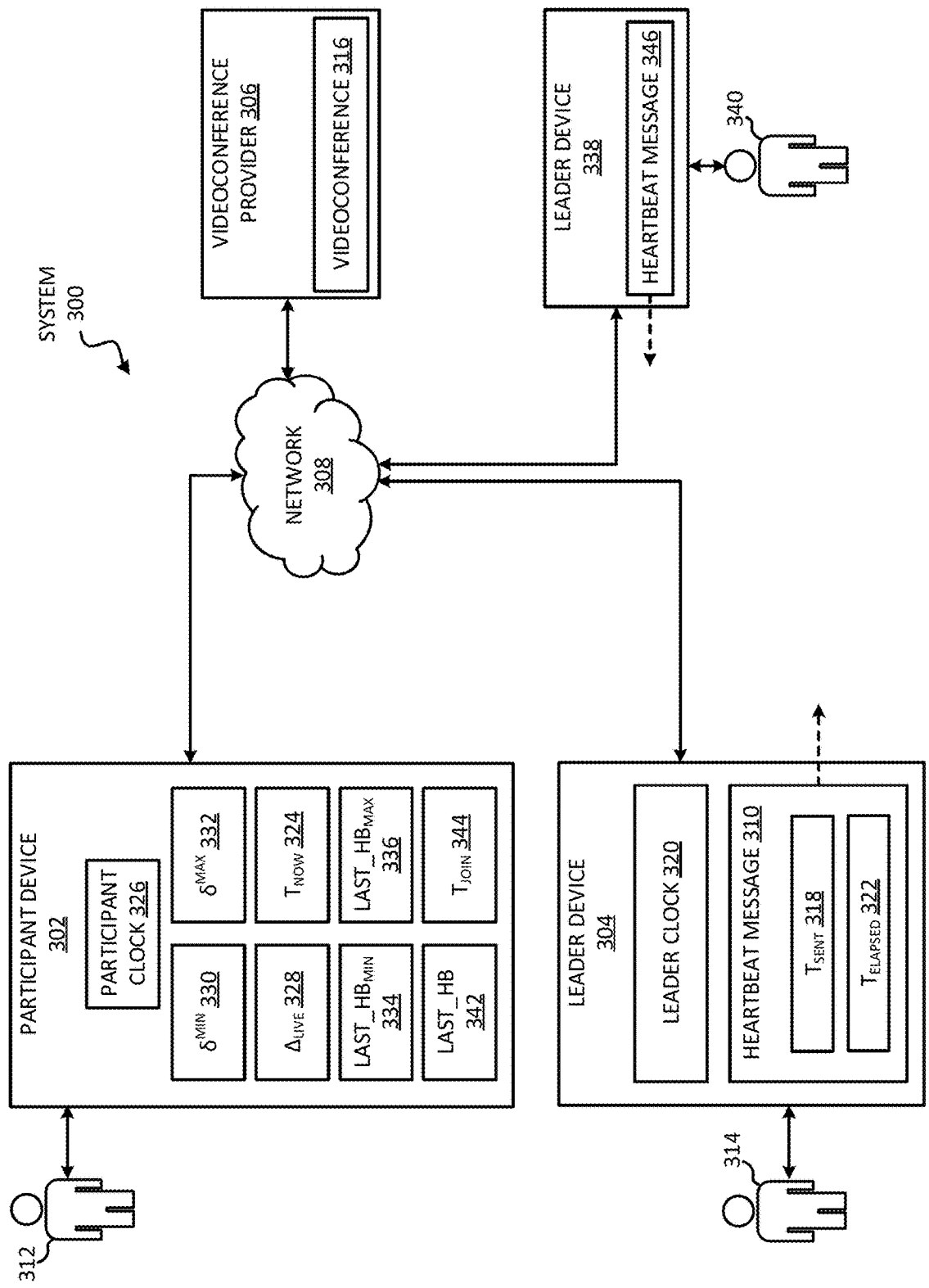
FIG. 3 shows a block diagram of an example of a system for providing a liveness protocol that corrects for clock drift according to some aspects of the present disclosure.

Turning now to FIG. 3, shown is a block diagram of an example of a system 300 for providing a liveness protocol that corrects for clock drift according to some aspects of the present disclosure. The system 300 can include any number of participant devices associated with any number of participants of the videoconference 316. One example of such participant devices is participant device 302, which is associated with a participant 312 of the videoconference 316. The participant devices can be laptop computers, desktop computers, mobile phones, or any of the other types of client devices described above.

The system 300 also includes a leader device 304 (e.g., a host device) associated with a leader 314 (e.g., a host) of the videoconference 316. The leader device 304 can also be considered a participant device, since the leader 314 is also a participant of the videoconference 316. The participant device 302 and the leader device 304 can each execute a videoconferencing application to engage in the videoconference 316 via one or more networks 308, such as the Internet. The videoconference 316 can be facilitated by a videoconference provider 306, such as the chat and videoconference providers 110, 210. For example, the videoconference provider 306 can route messages back-and-forth between the participant device 302 and the leader device 304 via the one or more networks 308, generate and store recordings and transcripts of the videoconference 316, and perform other functions.

Over the course of the videoconference 316, the leader device 304 can transmit heartbeat messages to the other participant devices associated with the videoconference 316. For example, the leader device 304 may transmit heartbeat messages at a periodic interval, such as every minute. Each participant device can receive and process the heartbeat messages to determine whether a liveness constraint is satisfied. If a participant device 302 determines that the liveness constraint is not satisfied based on a received heartbeat message 310, the participant device 302 can automatically disconnect from the videoconference 316. In this way, the participant device 302 can enforce compliance with the liveness constraint on itself. Enforcing compliance with the liveness constraint can help prevent against various security vulnerabilities that could arise, for example, if there is too much time between when the leader device 304 issues commands or performs actions and when they are detected by the participant device 302.

In some examples, the participant device 302 can check for compliance with the liveness constraint relatively continuously (e.g., once per second), regardless of whether or not a heartbeat message has been received. If a new heartbeat message has not yet been received by the participant device 302, the participant device 302 can use the information in the prior heartbeat message in its computations.

In each heartbeat message, the leader device 304 can include a send time associated with the heartbeat message. For example, the leader device 304 can include a send time ($T_{SENT}$) 318 in the heartbeat message 310. The send time 318 can be the time at which the leader device 304 sends the heartbeat message 310. The send time 318 can be determined according to the leader device's 304 local clock, referred to herein as the leader clock 320. For example, according to the leader clock 320, the leader device 304 may be configured to send the heartbeat message on May 3, 2023 at 2:00 PM eastern time. That date and time would be the send time 318.

In each heartbeat message, the leader device 304 can also include an elapsed time associated with the heartbeat message. For example, the leader device 304 can include an elapsed time ($T_{ELAPSED}$) 322 in the heartbeat message 310. The elapsed time 322 can be the actual or estimated amount of time that has elapsed between the last heartbeat message and the current heartbeat message 310, according to the leader. As used herein, the "last" heartbeat message refers to the heartbeat message that was sent immediately prior to the current heartbeat message 310. In one example, if the last heartbeat message was sent on May 3, 2023 at 1:57 PM eastern time, and the current heartbeat message 310 is sent on May 3, 2023 at 2:00 PM eastern time, then the elapsed time 322 is 3 minutes, because that is the amount of time that has elapsed between the two heartbeat messages.

After generating each heartbeat message, the leader device 304 can broadcast the heartbeat message to some or all of the participant devices. Each participant device can receive the heartbeat message and process it to determine whether a liveness constraint is satisfied.

For example, the participant device 302 can receive a heartbeat message 310 from the leader device 304. The participant device 302 can receive the heartbeat message 310 at a current time ($T_{NOW}$) 324 according to the participant clock 326. For example, according to the participant clock 326, the heartbeat message may have been received on May 3, 2023 at 11:00 AM pacific time. After receiving the heartbeat message 310, the participant device 302 can compute an estimated send time (LAST_HB) 342 at which the heartbeat message 310 was sent. The participant device 302 can compute the estimated send time based on the send time 318 in the heartbeat message 310 and other factors, as discussed in greater detail below. The participant device 302 can also determine a liveness protocol parameter ($\Delta_{LIVE}$) 328, which can be retrieved from memory. Having determined the current time 324, the liveness constraint 328, and the estimated send time, the participant device 302 can determine whether $T_{NOW}-\text{LAST\_HB} > \Delta_{LIVE}$, where $T_{now}$ is the current time according to the participant's clock. If so, the participant device 302 can automatically disconnect from the videoconference 316. Otherwise, the participant device 302 can maintain its connection to the videoconference 316.

As discussed above, the participant device 302 can compute an estimated send time (LAST_HB) 342 associated with the heartbeat message 310. Although the heartbeat message 310 indicates its send time 318 according to the leader clock 320, there may be differences between the leader clock 320 and the participant's clock 326 that make it challenging to determine exactly when the heartbeat message 310 was sent. For example, the two clocks may be out of sync for any number of reasons, such as hardware differences or a misconfigured time-zone. In some cases, the leader clock 320 may be ahead of the participant clock 326 and in other cases the leader clock 320 may be behind the participant clock 326. When there are multiple participant devices, the leader clock 320 may be ahead of some of their clocks and behind others. As a result of these clock differences, there may be some offset ($\delta$) between the leader clock 320 and the participant clock 326, which can make it inaccurate to rely on the send time 318 alone in some circumstances.

To help resolve the abovementioned problems, in some examples the participant device 302 can determine the estimated send time (LAST_HB) 342 based on the clock offset ($\delta$) between the participant clock 326 and the leader clock 320. But because it can be difficult to determine an exact clock offset, the participant device can compute an offset range. The offset range can have a lower boundary ($\delta^{min}$) 330 and an upper boundary ($\delta^{max}$) 332. Between the lower boundary and the upper boundary can be an estimated range of offset values between the two clocks. After determining the offset range, the participant device 302 can determine the estimated send time 342 according to the following scheme:

---
If $\delta^{max} < 0$ then
    LAST_HB = $T_{SENT} + \delta^{max}$
else if $\delta^{min} > 0$ then
    LAST_HB = $T_{SENT} + \delta^{min}$
else
    LAST_HB = $T_{SENT}$
--- where $\delta^{max}$ can be set by default to $+\infty$ (or another positive number) for the first heartbeat message but otherwise be a computed value, $\delta^{min}$ can be set to $-\infty$ (or another negative number) for the first heartbeat message but otherwise be a computed value, and $T_{SENT}$ can be the send time 318 extracted from the heartbeat message.

The offset upper boundary ($\delta^{max}$) 332 and the offset lower boundary ($\delta^{min}$) 330 can be dynamically adjusted over the course of the videoconference 316. For example, as more heartbeat messages are received by the participant device 302, the offset upper boundary and/or the offset lower boundary can be adjusted. With these adjustments, the boundaries can become more refined and the offset range can narrow. For example, when a heartbeat message 310 is received, the upper boundary 332 can be computed according to the following equation:

$$\delta^{max} = \text{MIN}(\delta^{max}, T_{RECEIPT} - T_{SENT})$$

Over time, as more heartbeat messages are received, because the lesser of the two values in the above comparison is selected as the offset upper boundary ($\delta^{max}$) 332, the value of the upper boundary 332 can gradually reduce thereby narrowing the offset range.

Similarly, the offset lower boundary ($\delta^{min}$) 330 can be dynamically adjusted over the course of the videoconference 316. For example, when a heartbeat message 310 is received, the lower boundary 330 can be computed according to the following equation:

$$\delta^{min} = \text{MAX}(\delta^{min}, \text{LAST\_HB}_{MIN} + T_{ELPASED} - T_{SENT})$$

where $T_{ELAPSED}$ is the elapsed time 322 extracted from the current heartbeat message 310, and where LAST_HB$_{MIN}$ 334 is a lower boundary value of an estimated time range (e.g., time window) in which the last heartbeat message was sent. The estimated time range also has an upper boundary value, LAST_HB$_{MAX}$ 336. The way in which LAST_HB$_{MIN}$ and LAST_HB$_{MAX}$ are computed is described in greater detail later on. Over time, as more heartbeat messages are received by the participant device 302, because the greater of the two values in the above comparison is selected as the lower boundary ($\delta^{min}$) 330, the value of the lower boundary 330 can gradually increase thereby narrowing the offset range.

In the above equation for $\delta^{min}$, if the heartbeat message 310 is the first heartbeat message received by the participant device 302 after joining the videoconference 316, then (LAST_HB$_{MIN}$+$T_{ELAPSED}$) can be replaced with the join time ($T_{JOIN}$) 344. The join time 344 is the time at which the participant device 302 joined the videoconference 316.

Using the above techniques, the participant device 302 can iteratively refine the offset range over the course of the videoconference 316 to obtain a more accurate range of possible offset values between the participant clock 326 and the leader clock 320. The participant device 302 can then use that offset range to more accurately estimate when the current heartbeat message 310 was sent, so that the participant device 302 can more accurately determine whether the liveness constraint is satisfied.

In some situations, the meeting leader (e.g., host) can change over the course of the videoconference 316. For example, the meeting leader may change from an old leader 314 to a new leader 340, which may have a different leader device 338. The participant device 302 can detect such a change in meeting leader and responsively perform a special process to account for the fact that the different leader devices 304, 338 have different clocks, which can have different offsets from the participant clock 326. One example of such a process is described later on with respect to FIG. 8.

In some examples, the participant device 302 can store a respective set of values for $\delta_{MAX}$ and $\delta_{MIN}$ for each individual meeting leader. When the leader changes to a new one, the participant device 302 can set the $\delta_{MAX}$ and $\delta_{MIN}$ values for the new meeting leader to $+\infty$ and $-\infty$, respectively. If the leader switches to a new one and then back to an old one, the participant device 302 continue using the prior $\delta_{MAX}$ and $\delta_{MIN}$ values for the old meeting leader from where they left off, prior to the switch.

Figure 4:
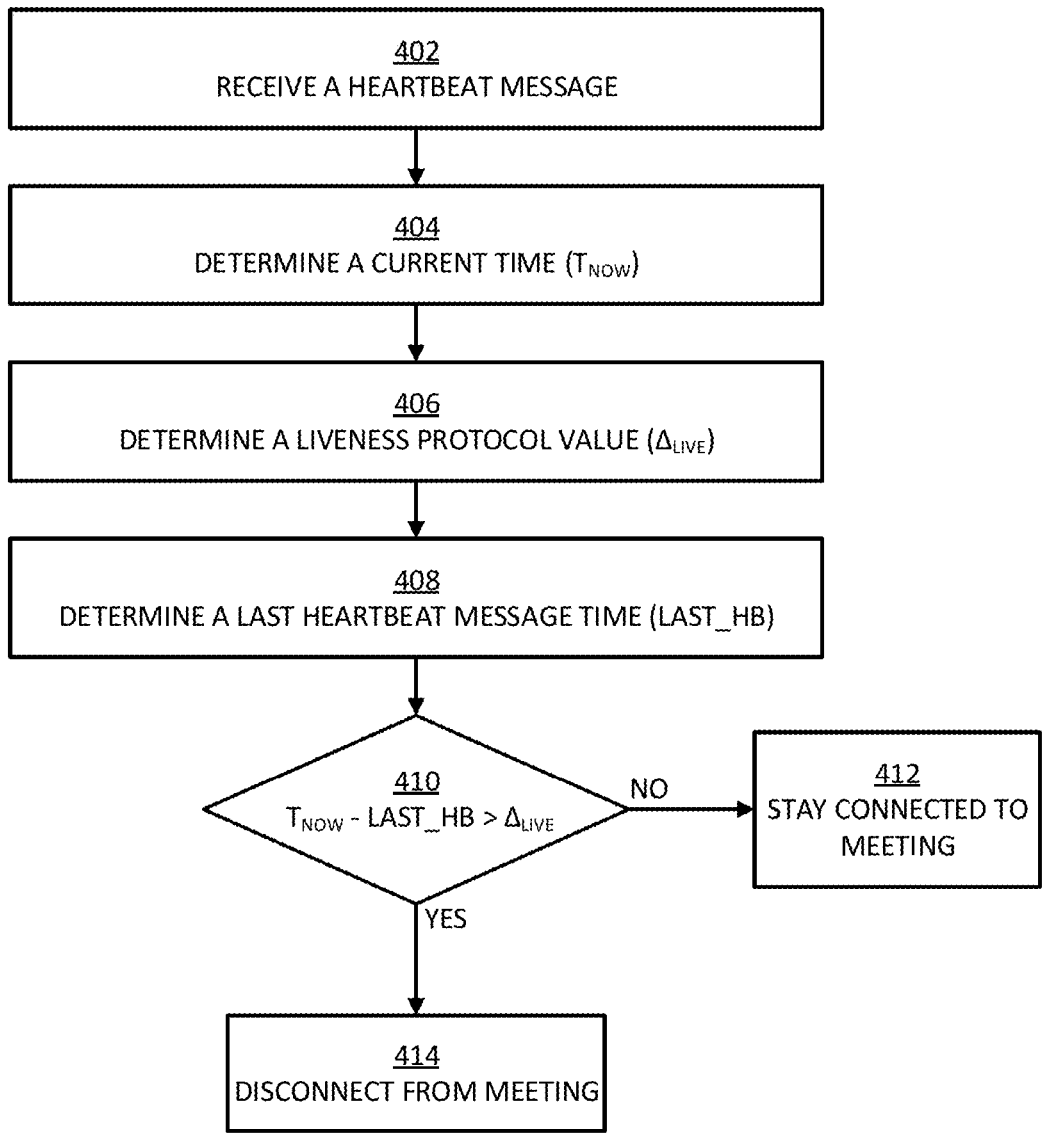
FIG. 4 shows a flowchart of an example of a process for evaluating compliance with a liveness constraint according to some aspects of the present disclosure.

Turning now to FIG. 4, shown is a flowchart of an example of a process for evaluating compliance with a liveness constraint according to some aspects of the present disclosure. Other examples may involve more operations, fewer operations, different operations, or a different sequence of operations than is shown in FIG. 4. The operations of FIG. 4 are described below with reference to the components of FIG. 3 above.

In block 402, a participant device 302 receives a heartbeat message 310 (e.g., from a leader device 304). The participant device 302 can receive the heartbeat message 310 via one or more networks 308, which may include a public network such as the Internet and/or a private network such as a local area network (LAN). The participant device 302 can be operated by a participant 312 in a videoconference 316.

In block 404, the participant device 302 determines a current time ($T_{NOW}$) 324. The participant device 302 determines the current time 324 according to its local clock, the participant clock 326. In some examples, the participant clock 326 can correspond to the system clock on the participant device 302.

In block 406, the participant device 302 determines a liveness protocol parameter ($\Delta_{LIVE}$) 328. This may be a predefined numerical value that is stored in memory. The liveness protocol parameter can be selected by an administrator associated with the videoconference 316, such as a videoconference provider 306. The participant device 302 can retrieve the liveness protocol parameter 328 from memory and use it as needed. The liveness protocol parameter 328 can establish the amount of liveness delay that is acceptable in the system.

In block 408, the participant device 302 determines a last heartbeat message time (LAST_HB) 342. In some examples, the participant device 302 can determine the last heartbeat message time 342 using the process described below with respect to FIG. 5.

In block 410, the participant device 302 determines whether the difference between the current time ($T_{NOW}$) and the last heartbeat message time (LAST_HB) 342 is greater than the liveness protocol parameter ($\Delta_{LIVE}$) 328. If so, the process can proceed to block 414, where the participant device 302 can automatically disconnect from the videoconference 316. Otherwise, the process can proceed to block 412, where the participant device 302 can stay connected to the videoconference 316.

Some or all of the process shown in FIG. 4 may repeat. For example, blocks 404-414 may be repeated periodically (e.g., once per second), regardless of whether a new heartbeat message has been received. If a new heartbeat message is received, its corresponding values can be used in the next iteration of the process.

Figure 5:
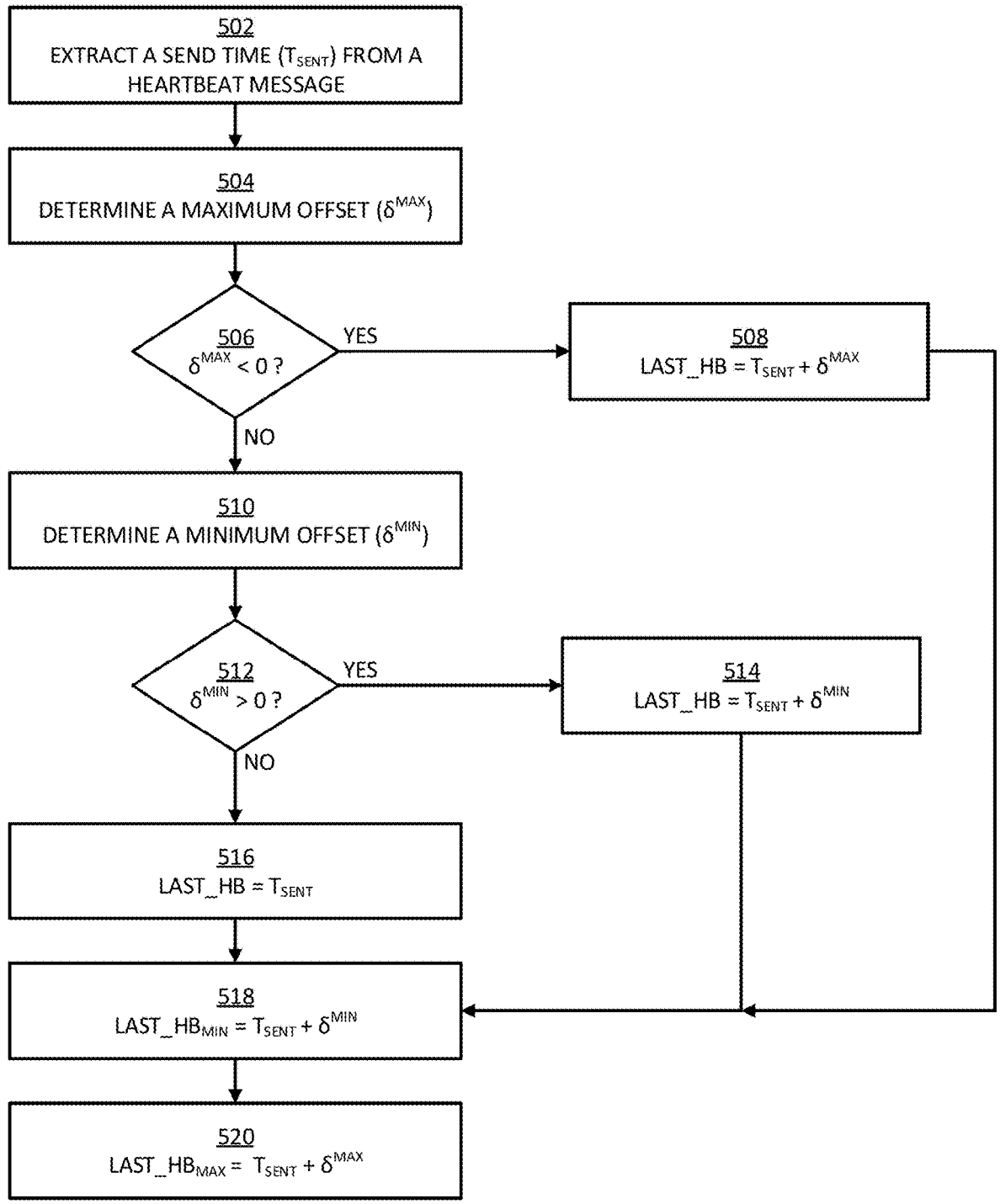
FIG. 5 shows a flowchart of an example of a process for computing a last heartbeat message time according to some aspects of the present disclosure.

Turning now to FIG. 5, shown is a flowchart of an example of a process for computing a last heartbeat message time 342 according to some aspects of the present disclosure. Other examples may involve more operations, fewer operations, different operations, or a different sequence of operations than is shown in FIG. 5. The operations of FIG. 5 are described below with reference to the components of FIG. 3 above.

In block 502, a participant device 302 extracts a send time ($T_{SENT}$) 318 from a heartbeat message 310. The heartbeat message 310 can be received from a leader device 304, which can determine the send time 318 and incorporate it into the heartbeat message 310.

In block 504, the participant device 302 determines a maximum offset ($\delta^{MAX}$) 332 defining an upper boundary of an offset range. The offset range can be a range of possible offsets between a participant clock 326 of the participant device 302 and a leader clock 320 of a leader device 304. In some examples, the participant device 302 can determine the maximum offset 332 using the process described later on with respect to FIG. 6.

In block 506, the participant device 302 determines whether the maximum offset 332 is less than zero. If so, then the process can proceed to block 508. Otherwise, the process can proceed to block 510.

In block 508, the participant device 302 determines the last heartbeat message time (LAST_HB) 342 based on the send time ($T_{SENT}$) 318 and the maximum offset ($\delta^{MAX}$) 332. For example, the participant device 302 can determine that the last heartbeat message time 342 is the sum of the send time 318 and the maximum offset 332. The last heartbeat message time 342 can be an estimated time at which the last heartbeat message, immediately prior to the current heartbeat message 310, was sent. After block 508, the process can continue to block 518 and proceed from there.

In block 510, the participant device 302 determines a minimum offset ($\delta^{MIN}$) 330 defining a lower boundary of the offset range. In some examples, the participant device 302 can determine the minimum offset 330 using the process described later on with respect to FIG. 7.

In block 512, the participant device 302 determines whether the minimum offset 330 is greater than zero. If so, then the process can proceed to block 514. Otherwise, the process can proceed to block 516.

In block 514, the participant device 302 determines last heartbeat message time 342 based on the send time 318 and the minimum offset 330. For example, the participant device 302 can determine that the last heartbeat message time 342 is the sum of the send time 318 and the minimum offset 330. After block 514, the process can continue to block 518 and proceed from there.

In block 516, the participant device 302 determines the last heartbeat message time (LAST_HB) 342. The participant device 302 can determine the last heartbeat message time 342 based on the send time 318. For example, the participant device 302 can determine that the last heartbeat message time 342 is equal to the send time 318.

In block 518, the participant device 302 determines a lower boundary value (LAST_HB$_{MIN}$) 334 for an estimated range of times in which the last heartbeat message was sent. The participant device 302 can determine the lower boundary value 334 based on the send time 318 and the minimum offset 330. For example, the participant device 302 can determine that the lower boundary value is equal to the sum of the send time 318 and the minimum offset 330.

In block 520, the participant device 302 determines an upper boundary value (LAST_HB$_{MAX}$) 336 for the range of times at which the last heartbeat message was sent. The participant device 302 can determine the upper boundary value 336 based on the send time 318 and the maximum offset 332. For example, the participant device 302 can determine that the upper boundary value 336 is equal to the sum of the send time 318 and the maximum offset 332.

Figure 6:
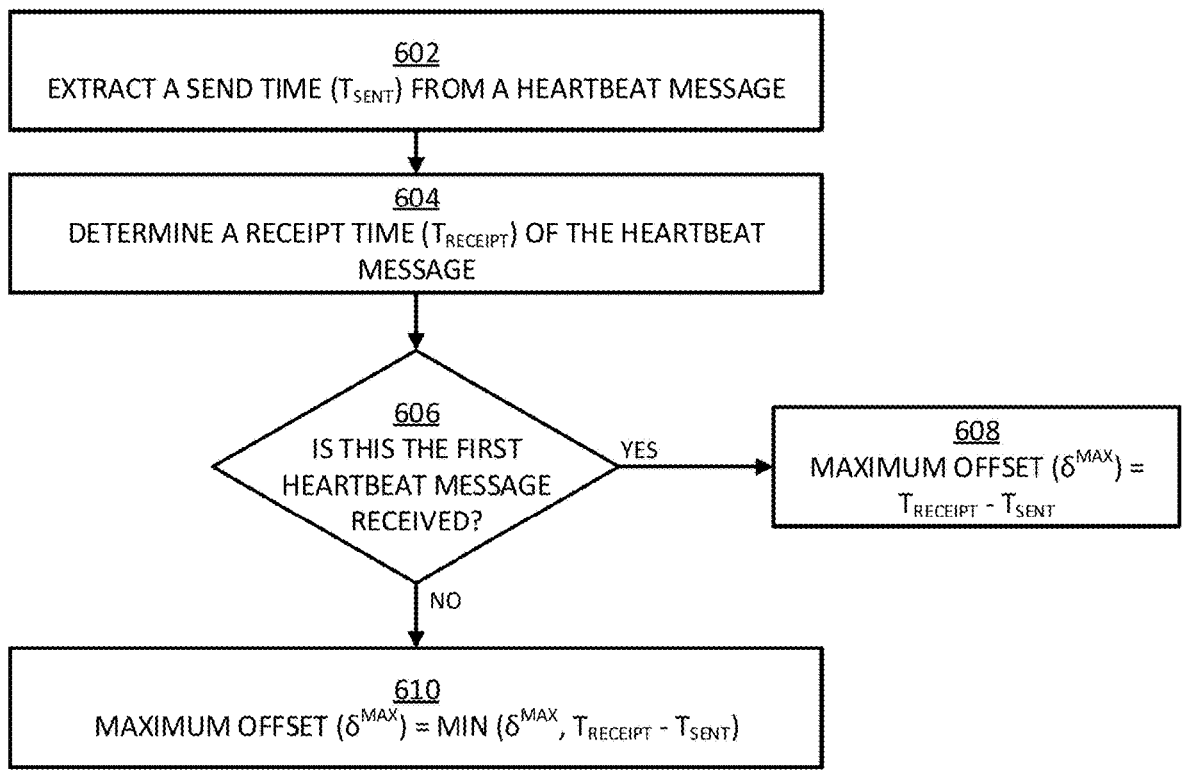
FIG. 6 shows a flowchart of an example of a process for computing a maximum offset for an offset range according to some aspects of the present disclosure.

Turning now to FIG. 6, shown is a flowchart of an example of a process for computing a maximum offset according to some aspects of the present disclosure. Other examples may involve more operations, fewer operations, different operations, or a different sequence of operations than is shown in FIG. 6. The operations of FIG. 6 are described below with reference to the components of FIG. 3 above.

In block 602, a participant device 302 extracts a send time ($T_{SENT}$) 318 from a heartbeat message 310. The participant device 302 can be associated with a participant of a videoconference 316. The heartbeat message 310 can be received from a leader device 304. The leader device 304 can determine the send time 318 (e.g., according to its local clock, which may be a system clock) and incorporate it into the heartbeat message 310.

In block 604, the participant device 302 determines a receipt time ($T_{RECEIPT}$) of the heartbeat message 310. The participant device 302 determines the receipt time according to the participant clock 326.

In block 606, the participant device 302 determines whether the heartbeat message 310 is the first heartbeat message received since the participant device 302 joined the videoconference 316. If so, the process can continue to block 608 where the participant device 302 can determine a maximum offset ($\delta^{MAX}$) 332 based on the receipt time and the send time 318. For example, the participant device 302 can determine that the maximum offset 332 is equal to $T_{RECEIPT}-T_{SENT}$. Otherwise, the process can continue to block 610.

In block 610, the participant device 302 determines the maximum offset ($\delta^{MAX}$) 332. The participant device 302 can determine the maximum offset 332 based on the send time 318, the receipt time, and/or the existing maximum offset ($\delta^{MAX}$). For example, the participant device 302 can compute a difference between the send time 318 and the receipt time. The participant device 302 can then determine the smaller of the difference and the existing maximum offset ($\delta^{MAX}$). The participant device 302 can select, as the new maximum offset 332, whichever of the two values is smaller. For example, if the existing maximum offset is 4 minutes and the difference is 2 minutes, the participant device 302 can set the new maximum offset 332 to 2 minutes.

Figure 7:
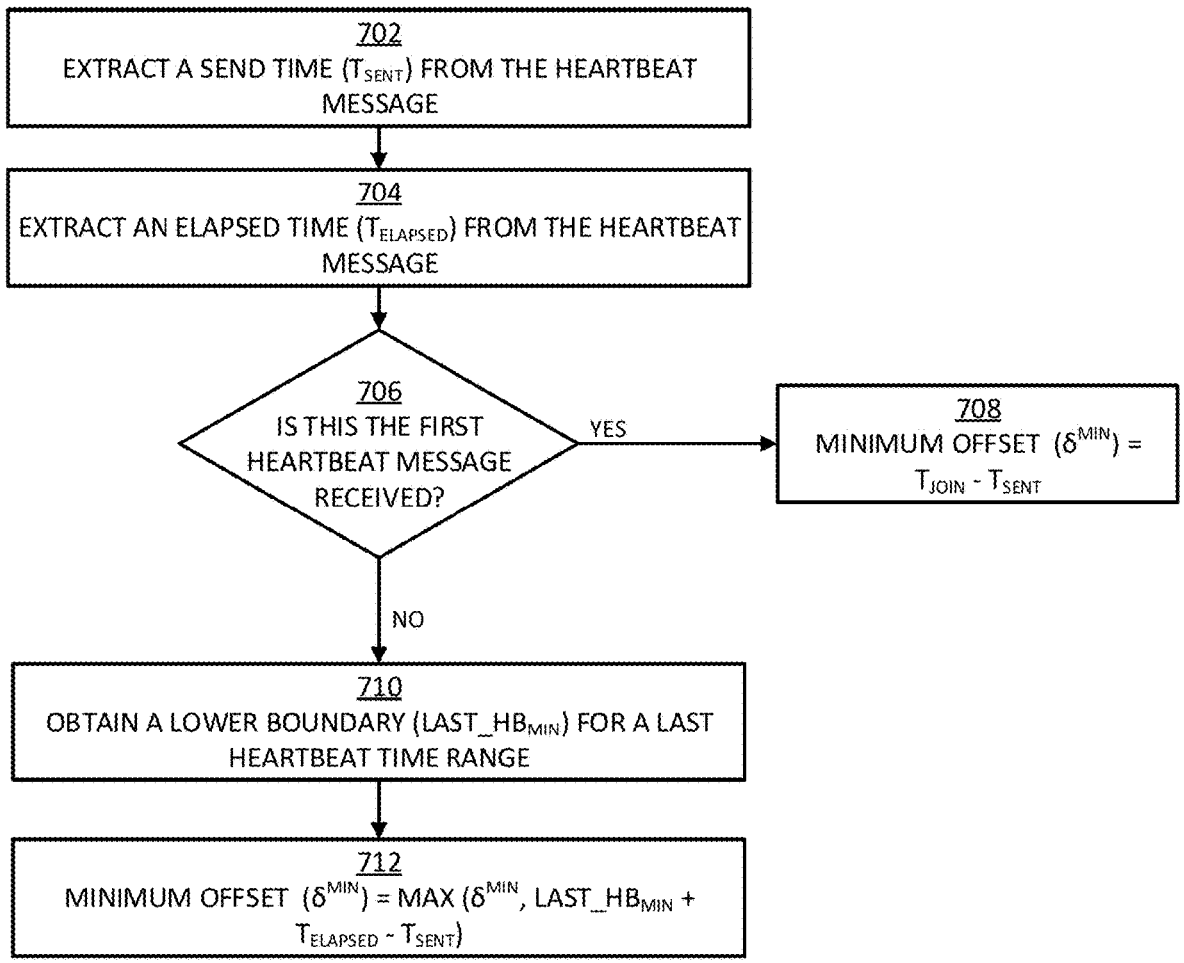
FIG. 7 shows a flowchart of an example of a process for computing a minimum offset for an offset range according to some aspects of the present disclosure.

Turning now to FIG. 7, shown is a flowchart of an example of a process for computing a minimum offset according to some aspects of the present disclosure. Other examples may involve more operations, fewer operations, different operations, or a different sequence of operations than is shown in FIG. 7. The operations of FIG. 7 are described below with reference to the components of FIG. 3 above.

In block 702, a participant device 302 extracts a send time ($T_{SENT}$) 318 from a heartbeat message 310. The heartbeat message 310 can be received from a leader device 304, which can determine the send time 318 and incorporate it into the heartbeat message 310.

In block 704, the participant device 302 extracts an elapsed time ($T_{ELAPSED}$) 322 from the heartbeat message 310. The leader device 304 can determine the elapsed time 322 and incorporate it into the heartbeat message 310.

In block 706, the participant device 302 determines whether the heartbeat message 310 is the first heartbeat message received since the participant device 302 joined the videoconference 316. If so, the process can continue to block 708. Otherwise, the process can continue to block 710.

In block 708, the participant device 302 determines the minimum offset ($\delta^{MIN}$) 330. The participant device 302 can determine the minimum offset 330 based on the send time 318 and the join time ($T_{JOIN}$) 344. For example, the participant device 302 can compute a difference between the send time 318 and $T_{JOIN}$ 344. The participant device 302 can then select that difference as the new minimum offset 330.

In block 710, the participant device 302 obtains a lower boundary (LAST_HB$_{MIN}$) 334 for an estimated time range in which the last heartbeat message was sent. The participant device 302 can obtain the lower boundary 334 from memory. The lower boundary 334 may have previously been computed and stored in memory upon the receipt of the last heartbeat message.

In block 712, the participant device 302 determines the minimum offset ($\delta^{MIN}$) 330. The participant device 302 can determine the minimum offset 330 based on the send time 318, LAST_HB$_{MIN}$ 334, $T_{ELAPSED}$, and/or the existing minimum offset ($\delta^{MIN}$). For example, the participant device 302 can compute a sum of LAST_HB$_{MIN}$ 334 and $T_{ELAPSED}$. The participant device 302 can then compute the difference between the sum and the send time 318. The participant device 302 can then determine the larger of the difference and the existing minimum offset ($\delta^{MIN}$). The participant device 302 can select, as the new minimum offset 330, whichever of the two values is larger.

Figure 8:
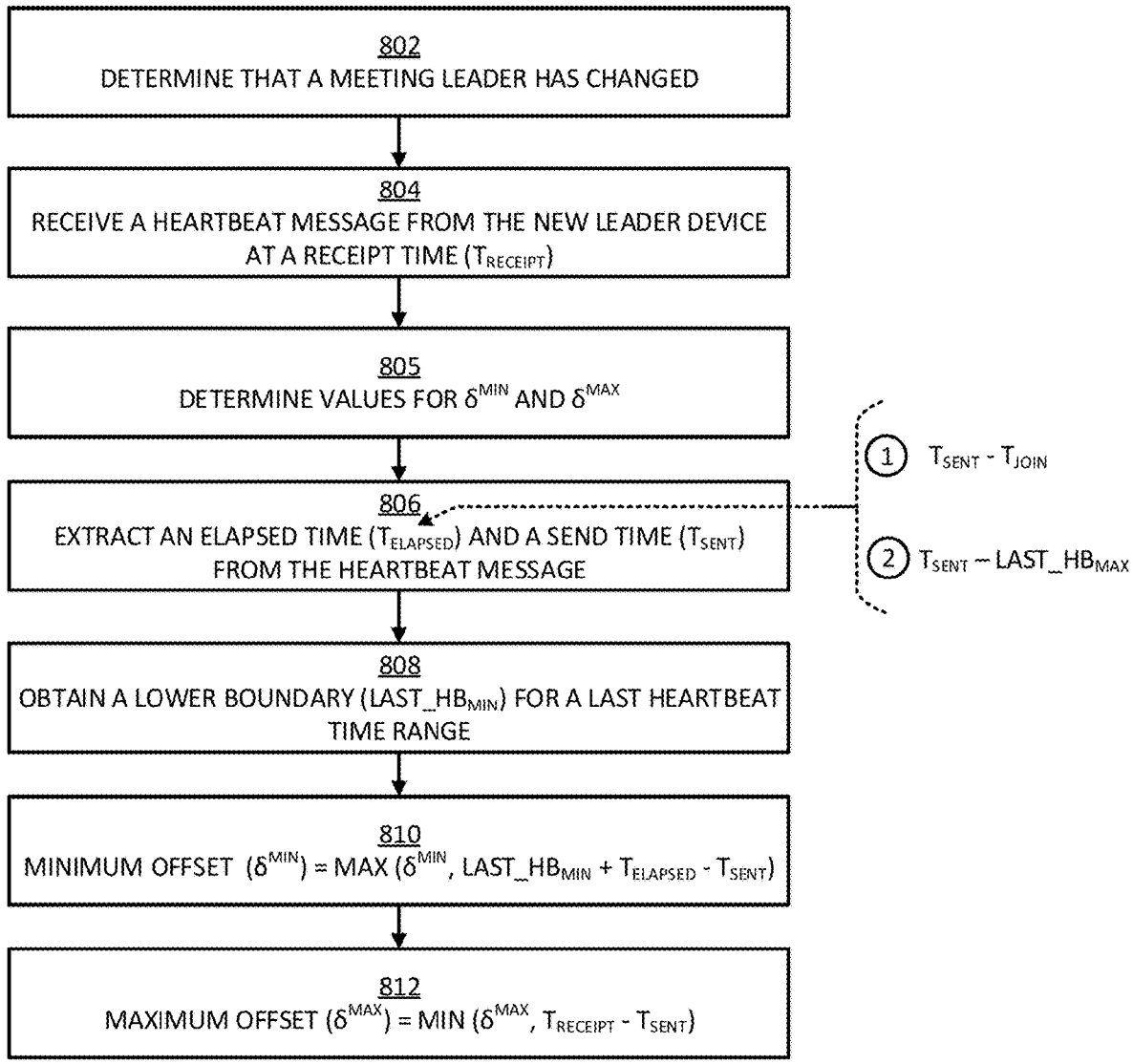
FIG. 8 shows a flowchart of an example of a process for handling a change in meeting leader according to some aspects of the present disclosure.

As noted earlier, there may be situations where the meeting leader changes over the course of the videoconference 316. In those situations, the participant device 302 may perform a special process to account for the fact that the new leader device has a different clock than the old leader device, and thus the new leader device's clock may have a different offset from the participant clock 326 than the old leader device's clock. One example of such a process is shown in FIG. 8, which will now be described. Of course, other examples may involve more operations, fewer operations, different operations, or a different sequence of operations than is shown in FIG. 8. The operations of FIG. 8 are described below with reference to the components of FIG. 3 above.

In block 802, a participant device 302 determines that the meeting leader associated with a videoconference 316 has changed from a first leader 314 to a second leader 340. The first leader 314 may be associated with a first leader device 304 and the second leader 340 may be associated with a second leader device 338. The second leader 340 may or may not have previously been a participant in the videoconference 316. If the second leader 340 was previously a participant in the videoconference 316, then the second leader device 338 may have previously been a second participant device that received heartbeat messages from the first leader device 304.

In some examples, the participant device 302 can determine that the meeting leader changed based on a notification. The notification may be transmitted by the new leader device 338, the videoconference provider 306, or another entity. The notification can indicate that the meeting leader changed and may identify the new meeting leader 340.

In block 804, the participant device 302 receives a heartbeat message 346 from the new leader device 338 associated with the new meeting leader 340. The participant device 302 can receive the heartbeat message 346 at a receipt time ($T_{RECEIPT}$). The heartbeat message 346 can include a send time ($T_{SENT}$) and an elapsed time ($T_{ELAPSED}$), similar to the prior heartbeat messages from the first leader device 304.

In block 805, the participant device 302 can determine values for the minimum offset ($\delta^{MIN}$) 330 and the maximum offset ($\delta^{MAX}$) 332. For example, the participant device 302 can store a respective set of values for $\delta_{MAX}$ and $\delta_{MIN}$ for each individual meeting leader. When the leader changes to a new one, the participant device 302 can set the $\delta_{MAX}$ and $\delta_{MIN}$ values for the new meeting leader to $+\infty$ and $-\infty$, respectively. If the meeting leader then switches back to an old leader, the participant device 302 continue using the prior $\delta_{MAX}$ and $\delta_{MIN}$ values for the old meeting leader (before the switch).

In block 806, the participant device 302 extracts the elapsed time and the send time from the heartbeat message 346.

In block 808, the participant device 302 obtains a lower boundary ($LAST\_HB_{MIN}$) 334 for an estimated time range in which the last heartbeat message was sent. The last heartbeat message may have been sent by the prior leader device 304, before the change in meeting leader. The participant device 302 can obtain the lower boundary 334 from memory. The lower boundary 334 may have previously been computed and stored in memory upon the receipt of the last heartbeat message.

In block 810, the participant device 302 determines the minimum offset ($\delta^{MIN}$) 330. For example, the participant device 302 can determine the minimum offset 330 using the equation shown in block 712, described above.

In block 812, the participant device 302 determines the maximum offset ($\delta^{MAX}$) 332. For example, the participant device 302 can determine the maximum offset 332 using the equation shown in block 610, described above.

In the process shown in FIG. 8, the elapsed time is extracted from the heartbeat message 346 and used to compute the minimum offset 330. The value of the elapsed time can be computed by the new leader device 338, for inclusion the heartbeat message 346, in different ways depending on whether the new meeting leader 340 was previously a participant in the videoconference 316. If the new meeting leader 340 was not previously a participant in the videoconference 316, then the elapsed time can be computed according to the first approach shown in FIG. 8. In the first approach, the $T_{ELAPSED}=T_{SENT}-T_{JOIN}$, where $T_{SENT}$ corresponds to the send time of the heartbeat message 346 according to the local clock of the new leader device 338, and where $T_{JOIN}$ corresponds to the time at which the new leader device 338 joined the videoconference 316. If the new meeting leader 340 was previously a participant in the videoconference 316, then the elapsed time can be computed according to the second approach shown in FIG. 8. In the second approach, the $T_{ELAPSED}=T_{SENT}-LAST\_HB_{MAX}$, where $LAST\_HB_{MAX}$ was previously computed by the leader device 338 (formerly as a participant device) according to the process shown in FIG. 5.

In some examples, each time the leader device 338 transmits a heartbeat message to the participant devices, the leader device 338 can set its own values for $LAST\_HB$, $LAST\_HB_{MAX}$, and $LAST\_HB_{MIN}$ to its local time. This can allow the leader to implement the liveness validation process if the leader transitions from being a meeting leader to a participant.

Figure 9:
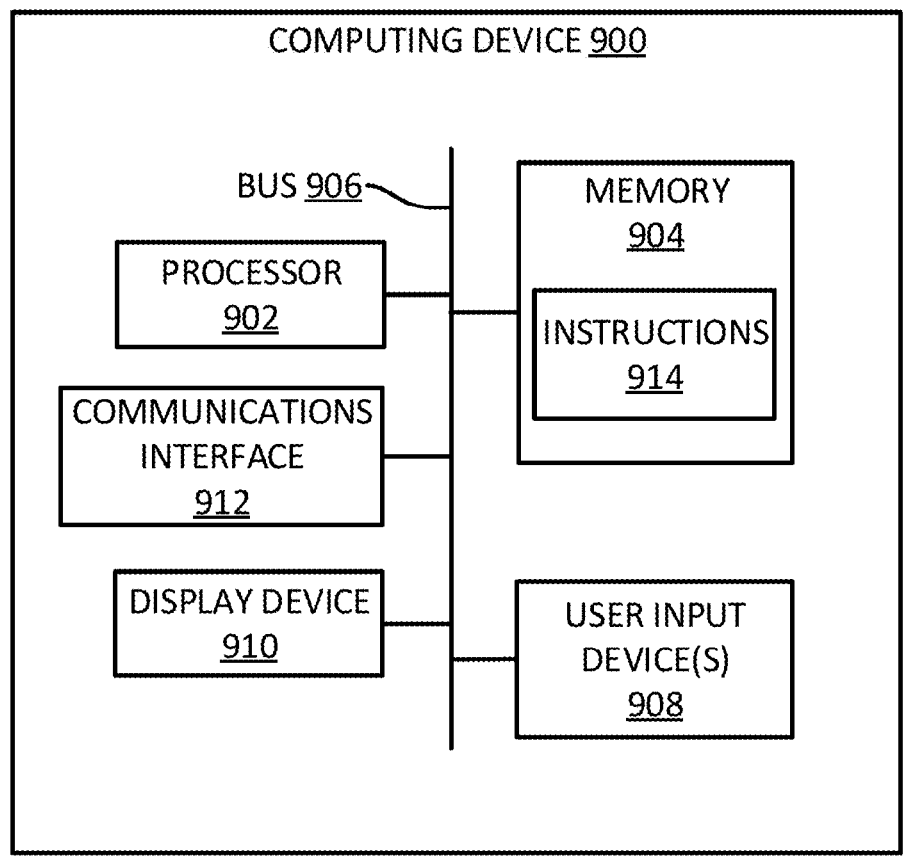
FIG. 9 shows a block diagram of an example of a computing device usable to implement some aspects of the present disclosure.

Turning now to FIG. 9, shown is a block diagram of an example of a computing device 900 usable to implement some aspects of the present disclosure. In some examples, the computing device 900 may correspond to any of the client devices or videoconference providers described above.

The computing device 900 includes a processor 902 that is in communication with the memory 904 and other components of the computing device 900 using one or more communications buses 906. The processor 902 is configured to execute processor-executable instructions 914 stored in the memory 904 to perform one or more processes described herein.

As shown, the computing device 900 also includes one or more user input devices 908 (e.g., a keyboard, mouse, touchscreen, video capture device, and/or microphone) to accept user input and the display device 910 to provide visual output to a user. The computing device 900 further includes a communications interface 912. In some examples, the communications interface 912 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A method comprising: receiving, by a participant device of a participant in a videoconferencing meeting, a heartbeat message from a leader device associated with the videoconferencing meeting; determining, by the participant device, a current time according to a first clock of the participant device; extracting, by the participant device, a send time from the heartbeat message, the send time being a time at which the heartbeat message was sent according to a second clock of the leader device; determining, by the participant device, an offset value indicating a difference between the first clock of the participant device and the second clock of the leader device; determining, by the participant device, a last heartbeat message time based on the send time and the offset value; and determining, by the participant device, whether to disconnect from the videoconferencing meeting based on current time, the last heartbeat message time, and a protocol parameter.

Example #2: The method of Example #1, further comprising: determining, by the participant device, a maximum offset, wherein the maximum offset is an upper boundary of an offset range corresponding to a time shift between the first clock and the second clock; determining, by the participant device, that the maximum offset is less than zero; and based on determining that the maximum offset is less than zero: determining, by the participant device, the last heartbeat message time based on the send time and the maximum offset; determining, by the participant device, a last heartbeat lower-boundary based on the send time and a minimum offset; and determining, by the participant device, a last heartbeat upper-boundary based on the send time and the maximum offset.

Example #3: The method of Example #2, further comprising: determining, by the participant device, a receipt time of the heartbeat message, the receipt time being a time at which the heartbeat message was received by the participant device; determining, by the participant device, whether the heartbeat message is a first heartbeat message received by the participant device after joining the videoconferencing meeting; and in response to determining that the heartbeat message is not the first heartbeat message, determining, by the participant device, the maximum offset based on a prior maximum offset, the receipt time, and the send time.

Example #4: The method of Example #2, further comprising: determining, by the participant device, a receipt time of the heartbeat message, the receipt time being a time at which the heartbeat message was received by the participant device; determining, by the participant device, whether the heartbeat message is a first heartbeat message received by the participant device after joining the videoconferencing meeting; and in response to determining that the heartbeat message is the first heartbeat message, determining, by the participant device, the maximum offset based on the receipt time and the send time.

Example #5 The method of any of Examples #1-4, further comprising: determining, by the participant device, a minimum offset, wherein the minimum offset is a lower boundary of an offset range corresponding to a time shift between the first clock and the second clock; determining, by the participant device, that the minimum offset is greater than zero; and based on determining that the minimum offset is greater than zero: determining, by the participant device, the last heartbeat message time based on the send time and the minimum offset; determining, by the participant device, a last heartbeat lower-boundary based on the send time and the minimum offset; and determining, by the participant device, a last heartbeat upper-boundary based on the send time and a maximum offset.

Example #6: The method of Example #5, further comprising: extracting, by the participant device, an elapsed time from the heartbeat message, the elapsed time being a time difference between the heartbeat message and a last heartbeat message; determining, by the participant device, whether the heartbeat message is a first heartbeat message received by the participant device after joining the videoconferencing meeting; and in response to determining that the heartbeat message is not the first heartbeat message: obtaining, by the participant device, a last heartbeat lower-boundary, the last heartbeat lower-boundary being a lower boundary of a time range in which the last heartbeat message was sent by the leader device; and determining, by the participant device, the minimum offset based on the last heartbeat lower-boundary, the elapsed time, and the send time.

Example #7: The method of Example #5, further comprising: determining, by the participant device, whether the heartbeat message is a first heartbeat message received by the participant device after joining the videoconferencing meeting; and in response to determining that the heartbeat message is the first heartbeat message, determining, by the participant device, the minimum offset based on the send time and a join time at which the participant device joined the videoconferencing meeting.

Example #8: The method of any of Examples #1-7, wherein the leader device is a first leader device, the heartbeat message is first heartbeat message, and further comprising: determining, by the participant device, that a meeting leader associated with the videoconferencing meeting has changed from a first leader to a second leader, the firsts leader being associated with the first leader device to the second leader being associated with a second leader device; receiving, by the participant device, a second heartbeat message from the second leader device; extracting, by the participant device, an elapsed time from the second heartbeat message; obtaining, by the participant device, a last heartbeat lower-boundary, the last heartbeat lower-boundary being a lower boundary of a time range in which the first heartbeat message was sent by the first leader device; and determining, by the participant device, a minimum offset based on the last heartbeat lower-boundary, the elapsed time, and the send time, wherein the minimum offset is a lower boundary of an offset range corresponding to a time shift between the first clock and the second clock.

Example #9: A participant device, comprising: one or more processors; and one or more memories including instructions that are executable by the one or more processors to cause the one or more processors to perform operations comprising: receiving, during a videoconferencing meeting, a heartbeat message from a leader device associated with the videoconferencing meeting; determining a current time according to a first clock of the participant device; extracting a send time from the heartbeat message, the send time being a time at which the heartbeat message was sent according to a second clock of the leader device; determining an offset value indicating a difference between the first clock of the participant device and the second clock of the leader device; determining a last heartbeat message time based on the send time and the offset value; and determining whether to disconnect from the videoconferencing meeting based on current time, the last heartbeat message time, and a protocol parameter.

Example #10: The participant device of Example #9, wherein the operations further comprise: determining a maximum offset, wherein the maximum offset is an upper boundary of an offset range corresponding to a time shift between the first clock and the second clock; determining that the maximum offset is less than zero; and based on determining that the maximum offset is less than zero: determining the last heartbeat message time based on the send time and the maximum offset; determining a last heartbeat lower-boundary based on the send time and a minimum offset; and determining a last heartbeat upper-boundary based on the send time and the maximum offset.

Example #11: The participant device of Example #10, wherein the operations further comprise: determining a receipt time of the heartbeat message, the receipt time being a time at which the heartbeat message was received by the participant device; determining whether the heartbeat message is a first heartbeat message received by the participant device after joining the videoconferencing meeting; and in response to determining that the heartbeat message is not the first heartbeat message, determining the maximum offset based on a prior maximum offset, the receipt time, and the send time.

Example #12: The participant device of Example #10, wherein the operations further comprise: determining a receipt time of the heartbeat message, the receipt time being a time at which the heartbeat message was received by the participant device; determining whether the heartbeat message is a first heartbeat message received by the participant device after joining the videoconferencing meeting; and in response to determining that the heartbeat message is the first heartbeat message, determining that the maximum offset is equal to a difference between the receipt time and the send time.

Example #13: The participant device of any of Examples #9-12, wherein the operations further comprise: determining a minimum offset, wherein the minimum offset is a lower boundary of an offset range corresponding to a time shift between the first clock and the second clock; determining that the minimum offset is greater than zero; and based on determining that the minimum offset is greater than zero: determining the last heartbeat message time based on the send time and the minimum offset; determining a last heartbeat lower-boundary based on the send time and the minimum offset; and determining a last heartbeat upper-boundary based on the send time and a maximum offset.

Example #14: The participant device of Example #13, wherein the operations further comprise: extracting an elapsed time from the heartbeat message, the elapsed time being a time difference between the heartbeat message and a last heartbeat message; determining whether the heartbeat message is a first heartbeat message received by the participant device after joining the videoconferencing meeting; and in response to determining that the heartbeat message is not the first heartbeat message: obtaining a last heartbeat lower-boundary, the last heartbeat lower-boundary being a lower boundary of a time range in which the last heartbeat message was sent by the leader device; and determining the minimum offset based on the last heartbeat lower-boundary, the elapsed time, and the send time.

Example #15: The participant device of Example #13, wherein the operations further comprise: determining whether the heartbeat message is a first heartbeat message received by the participant device after joining the videoconferencing meeting; and in response to determining that the heartbeat message is the first heartbeat message, determining the minimum offset based on the send time and a join time at which the participant device joined the videoconferencing meeting.

Example #16: The participant device of any of Examples #9-15, wherein the leader device is a first leader device, the heartbeat message is first heartbeat message, and wherein the operations further comprise: determining that a meeting leader associated with the videoconferencing meeting has changed from a first leader to a second leader, the firsts leader being associated with the first leader device to the second leader being associated with a second leader device; receiving a second heartbeat message from the second leader device; extracting an elapsed time from the second heartbeat message; obtaining a last heartbeat lower-boundary, the last heartbeat lower-boundary being a lower boundary of a time range in which the first heartbeat message was sent by the first leader device; and determining a minimum offset based on the last heartbeat lower-boundary, the elapsed time, and the send time, wherein the minimum offset is a lower boundary of an offset range corresponding to a time shift between the first clock and the second clock.

Example #17: A non-transitory computer-readable medium comprising program code that is executable by one or more processors to cause the one or more processors to perform operations including: receiving, during a videoconferencing meeting, a heartbeat message from a leader device associated with the videoconferencing meeting; determining a current time according to a first clock of a participant device; extracting a send time from the heartbeat message, the send time being a time at which the heartbeat message was sent according to a second clock of the leader device; determining an offset value indicating a difference between the first clock of the participant device and the second clock of the leader device; determining a last heartbeat message time based on the send time and the offset value; and determining whether to disconnect from the videoconferencing meeting based on current time, the last heartbeat message time, and a protocol parameter.

Example #18: The non-transitory computer-readable medium of Example #17, wherein the operations further comprise: determining a maximum offset, wherein the maximum offset is an upper boundary of an offset range corresponding to a time shift between the first clock and the second clock; determining that the maximum offset is less than zero; and based on determining that the maximum offset is less than zero: determining the last heartbeat message time based on the send time and the maximum offset; determining a last heartbeat lower-boundary based on the send time and a minimum offset; and determining a last heartbeat upper-boundary based on the send time and the maximum offset.

Example #19: The non-transitory computer-readable medium of any of Examples #17-18, wherein the operations further comprise: determining a minimum offset, wherein the minimum offset is a lower boundary of an offset range corresponding to a time shift between the first clock and the second clock; determining that the minimum offset is greater than zero; and based on determining that the minimum offset is greater than zero: determining the last heartbeat message time based on the send time and the minimum offset; determining a last heartbeat lower-boundary based on the send time and the minimum offset; and determining a last heartbeat upper-boundary based on the send time and a maximum offset.

Example #20: The non-transitory computer-readable medium of any of Examples #17-19, wherein the leader device is a first leader device, the heartbeat message is a first heartbeat message, and wherein the operations further comprise: determining that a meeting leader associated with the videoconferencing meeting has changed from a first leader to a second leader, the firsts leader being associated with the first leader device to the second leader being associated with a second leader device; receiving a second heartbeat message from the second leader device; extracting an elapsed time from the second heartbeat message; obtaining a last heartbeat lower-boundary, the last heartbeat lower-boundary being a lower boundary of a time range in which the first heartbeat message was sent by the first leader device; and determining a minimum offset based on the last heartbeat lower-boundary, the elapsed time, and the send time, wherein the minimum offset is a lower boundary of an offset range corresponding to a time shift between the first clock and the second clock.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
   receiving, by a participant device of a participant in a videoconferencing meeting, a heartbeat message from a leader device associated with the videoconferencing meeting;
   determining, by the participant device, a current time according to a first clock of the participant device;
   extracting, by the participant device, a send time from the heartbeat message, the send time being a time at which the heartbeat message was sent according to a second clock of the leader device;
   determining, by the participant device, an offset value indicating a difference between the first clock of the participant device and the second clock of the leader device;
   determining, by the participant device, a last heartbeat message time based on the send time and the offset value; and
   determining, by the participant device, whether to disconnect from the videoconferencing meeting based on current time, the last heartbeat message time, and a protocol parameter.

2. The method of claim 1, further comprising:
   determining, by the participant device, a maximum offset, wherein the maximum offset is an upper boundary of an offset range corresponding to a time shift between the first clock and the second clock;
   determining, by the participant device, that the maximum offset is less than zero; and
   based on determining that the maximum offset is less than zero:
   determining, by the participant device, the last heartbeat message time based on the send time and the maximum offset;
   determining, by the participant device, a last heartbeat lower-boundary based on the send time and a minimum offset; and
   determining, by the participant device, a last heartbeat upper-boundary based on the send time and the maximum offset.

3. The method of claim 2, further comprising:
   determining, by the participant device, a receipt time of the heartbeat message, the receipt time being a time at which the heartbeat message was received by the participant device;
   determining, by the participant device, whether the heartbeat message is a first heartbeat message received by the participant device after joining the videoconferencing meeting; and
   in response to determining that the heartbeat message is not the first heartbeat message, determining, by the participant device, the maximum offset based on a prior maximum offset, the receipt time, and the send time.

4. The method of claim 2, further comprising:
   determining, by the participant device, a receipt time of the heartbeat message, the receipt time being a time at which the heartbeat message was received by the participant device;
   determining, by the participant device, whether the heartbeat message is a first heartbeat message received by the participant device after joining the videoconferencing meeting; and
   in response to determining that the heartbeat message is the first heartbeat message, determining, by the participant device, the maximum offset based on the receipt time and the send time.

5. The method of claim 1, further comprising:
   determining, by the participant device, a minimum offset, wherein the minimum offset is a lower boundary of an offset range corresponding to a time shift between the first clock and the second clock;
   determining, by the participant device, that the minimum offset is greater than zero; and
   based on determining that the minimum offset is greater than zero:
      determining, by the participant device, the last heartbeat message time based on the send time and the minimum offset;
      determining, by the participant device, a last heartbeat lower-boundary based on the send time and the minimum offset; and
      determining, by the participant device, a last heartbeat upper-boundary based on the send time and a maximum offset.

6. The method of claim 5, further comprising:
   extracting, by the participant device, an elapsed time from the heartbeat message, the elapsed time being a time difference between the heartbeat message and a last heartbeat message;
   determining, by the participant device, whether the heartbeat message is a first heartbeat message received by the participant device after joining the videoconferencing meeting; and
   in response to determining that the heartbeat message is not the first heartbeat message:
      obtaining, by the participant device, a last heartbeat lower-boundary, the last heartbeat lower-boundary being a lower boundary of a time range in which the last heartbeat message was sent by the leader device; and
      determining, by the participant device, the minimum offset based on the last heartbeat lower-boundary, the elapsed time, and the send time.

7. The method of claim 5, further comprising:
   determining, by the participant device, whether the heartbeat message is a first heartbeat message received by the participant device after joining the videoconferencing meeting; and
   in response to determining that the heartbeat message is the first heartbeat message, determining, by the participant device, the minimum offset based on the send time and a join time at which the participant device joined the videoconferencing meeting.

8. The method of claim 1, wherein the leader device is a first leader device, the heartbeat message is first heartbeat message, and further comprising:
   determining, by the participant device, that a meeting leader associated with the videoconferencing meeting has changed from a first leader to a second leader, the firsts leader being associated with the first leader device to the second leader being associated with a second leader device;
   receiving, by the participant device, a second heartbeat message from the second leader device;
   extracting, by the participant device, an elapsed time from the second heartbeat message;
   obtaining, by the participant device, a last heartbeat lower-boundary, the last heartbeat lower-boundary being a lower boundary of a time range in which the first heartbeat message was sent by the first leader device; and
   determining, by the participant device, a minimum offset based on the last heartbeat lower-boundary, the elapsed time, and the send time, wherein the minimum offset is a lower boundary of an offset range corresponding to a time shift between the first clock and the second clock.

9. A participant device, comprising:
   one or more processors; and
   one or more memories including instructions that are executable by the one or more processors to cause the one or more processors to perform operations comprising:
      receiving, during a videoconferencing meeting, a heartbeat message from a leader device associated with the videoconferencing meeting;
      determining a current time according to a first clock of the participant device;
      extracting a send time from the heartbeat message, the send time being a time at which the heartbeat message was sent according to a second clock of the leader device;
      determining an offset value indicating a difference between the first clock of the participant device and the second clock of the leader device;
      determining a last heartbeat message time based on the send time and the offset value; and
      determining, while still connected to the videoconferencing meeting, whether to disconnect from the videoconferencing meeting based on the current time, the last heartbeat message time, and a protocol parameter.

10. The participant device of claim 9, wherein the operations further comprise:
   determining a maximum offset, wherein the maximum offset is an upper boundary of an offset range corresponding to a time shift between the first clock and the second clock;
   determining that the maximum offset is less than zero; and
   based on determining that the maximum offset is less than zero:
      determining the last heartbeat message time based on the send time and the maximum offset;
      determining a last heartbeat lower-boundary based on the send time and a minimum offset; and
      determining a last heartbeat upper-boundary based on the send time and the maximum offset.

11. The participant device of claim 10, wherein the operations further comprise:
   determining a receipt time of the heartbeat message, the receipt time being a time at which the heartbeat message was received by the participant device;
   determining whether the heartbeat message is a first heartbeat message received by the participant device after joining the videoconferencing meeting; and
   in response to determining that the heartbeat message is not the first heartbeat message, determining the maximum offset based on a prior maximum offset, the receipt time, and the send time.

12. The participant device of claim 10, wherein the operations further comprise:
   determining a receipt time of the heartbeat message, the receipt time being a time at which the heartbeat message was received by the participant device;
   determining whether the heartbeat message is a first heartbeat message received by the participant device after joining the videoconferencing meeting; and
   in response to determining that the heartbeat message is the first heartbeat message, determining that the maximum offset is equal to a difference between the receipt time and the send time.

13. The participant device of claim 9, wherein the operations further comprise:
   determining a minimum offset, wherein the minimum offset is a lower boundary of an offset range corresponding to a time shift between the first clock and the second clock;
   determining that the minimum offset is greater than zero; and
   based on determining that the minimum offset is greater than zero:
      determining the last heartbeat message time based on the send time and the minimum offset;
      determining a last heartbeat lower-boundary based on the send time and the minimum offset; and
      determining a last heartbeat upper-boundary based on the send time and a maximum offset.

14. The participant device of claim 13, wherein the operations further comprise:
   extracting an elapsed time from the heartbeat message, the elapsed time being a time difference between the heartbeat message and a last heartbeat message;
   determining whether the heartbeat message is a first heartbeat message received by the participant device after joining the videoconferencing meeting; and
   in response to determining that the heartbeat message is not the first heartbeat message:
      obtaining a last heartbeat lower-boundary, the last heartbeat lower-boundary being a lower boundary of a time range in which the last heartbeat message was sent by the leader device; and
      determining the minimum offset based on the last heartbeat lower-boundary, the elapsed time, and the send time.

15. The participant device of claim 13, wherein the operations further comprise:
   determining whether the heartbeat message is a first heartbeat message received by the participant device after joining the videoconferencing meeting; and
   in response to determining that the heartbeat message is the first heartbeat message, determining the minimum offset based on the send time and a join time at which the participant device joined the videoconferencing meeting.

16. The participant device of claim 9, wherein the leader device is a first leader device, the heartbeat message is first heartbeat message, and wherein the operations further comprise:
   determining that a meeting leader associated with the videoconferencing meeting has changed from a first leader to a second leader, the firsts leader being associated with the first leader device to the second leader being associated with a second leader device;
   receiving a second heartbeat message from the second leader device;
   extracting an elapsed time from the second heartbeat message;
   obtaining a last heartbeat lower-boundary, the last heartbeat lower-boundary being a lower boundary of a time range in which the first heartbeat message was sent by the first leader device; and
   determining a minimum offset based on the last heartbeat lower-boundary, the elapsed time, and the send time, wherein the minimum offset is a lower boundary of an offset range corresponding to a time shift between the first clock and the second clock.

17. A non-transitory computer-readable medium comprising program code that is executable by one or more processors to cause the one or more processors to perform operations including:
   receiving, during a videoconferencing meeting, a heartbeat message from a leader device associated with the videoconferencing meeting;
   determining a current time according to a first clock of a participant device;
   extracting a send time from the heartbeat message, the send time being a time at which the heartbeat message was sent according to a second clock of the leader device;
   determining an offset value indicating a difference between the first clock of the participant device and the second clock of the leader device;
   determining a last heartbeat message time based on the send time and the offset value; and
   determining, while still connected to the videoconferencing meeting, whether to disconnect from the videoconferencing meeting based on the current time, the last heartbeat message time, and a protocol parameter.

18. The non-transitory computer-readable medium of claim 17, wherein the operations further comprise:
   determining a maximum offset, wherein the maximum offset is an upper boundary of an offset range corresponding to a time shift between the first clock and the second clock;
   determining that the maximum offset is less than zero; and
   based on determining that the maximum offset is less than zero:
      determining the last heartbeat message time based on the send time and the maximum offset;
      determining a last heartbeat lower-boundary based on the send time and a minimum offset; and
      determining a last heartbeat upper-boundary based on the send time and the maximum offset.

19. The non-transitory computer-readable medium of claim 17, wherein the operations further comprise:
   determining a minimum offset, wherein the minimum offset is a lower boundary of an offset range corresponding to a time shift between the first clock and the second clock;
   determining that the minimum offset is greater than zero; and
   based on determining that the minimum offset is greater than zero:
      determining the last heartbeat message time based on the send time and the minimum offset;
      determining a last heartbeat lower-boundary based on the send time and the minimum offset; and
      determining a last heartbeat upper-boundary based on the send time and a maximum offset.

20. The non-transitory computer-readable medium of claim 17, wherein the leader device is a first leader device, the heartbeat message is first heartbeat message, and wherein the operations further comprise:
   determining that a meeting leader associated with the videoconferencing meeting has changed from a first leader to a second leader, the firsts leader being associated with the first leader device to the second leader being associated with a second leader device;
   receiving a second heartbeat message from the second leader device;
   extracting an elapsed time from the second heartbeat message;

obtaining a last heartbeat lower-boundary, the last heartbeat lower-boundary being a lower boundary of a time range in which the first heartbeat message was sent by the first leader device; and determining a minimum offset based on the last heartbeat lower-boundary, the elapsed time, and the send time, wherein the minimum offset is a lower boundary of an offset range corresponding to a time shift between the first clock and the second clock.

\* \* \* \* \*